United States Patent
Brown et al.

[15] 3,661,409
[45] May 9, 1972

[54] MULTI-SEGMENT CLAMP

[72] Inventors: Robert T. Brown; Don E. E. Vogler; Gerald A. Marsh, all of Houston, Tex.

[73] Assignee: Gray Tool Company, Houston, Tex.

[22] Filed: Aug. 14, 1969

[21] Appl. No.: 850,169

[52] U.S. Cl. ............................... 285/82, 24/285, 29/157 R, 29/526, 285/367
[51] Int. Cl. ....................................................... F16l 17/06
[58] Field of Search ............... 285/367, 366, 365, 411, 410, 285/409, 364, 82; 24/285, 279, 243 H, 243 AE, 249 LS, 249 PP; 29/157 R, 526

[56] References Cited

UNITED STATES PATENTS

| | | | |
|---|---|---|---|
| 3,214,202 | 10/1965 | Maychark | 285/364 |
| 2,640,717 | 6/1953 | Scheuring | 285/411 |
| 3,070,388 | 12/1962 | Werth | 285/411 |
| 3,231,297 | 1/1966 | Watts et al. | 285/24 |

FOREIGN PATENTS OR APPLICATIONS

530,318  7/1954  Belgium ........................... 285/365

*Primary Examiner*—Thomas F. Callaghan
*Attorney*—Cushman, Darby & Cushman

[57] ABSTRACT

The clamping wedges are composed of similar tapered segments joined together by link bars and pins to form an unending chain whose circumference is varied by a threaded drive screw joining the end segments. Decreasing the chain circumference forces the wedges onto mating tapers on the conduit joint, drawing them together by mechanical advantage. Structure is provided for permitting limited axial movement of the clamps during joint make-up to facilitate drawing together the parts to be joined from a separated position.

11 Claims, 16 Drawing Figures

INVENTORS
ROBERT T. BROWN
BY DON E. E. VOGLER
GERALD A. MARSH
Cushman Darby & Cushman
ATTORNEYS INVENTORS
ROBERT T. BROWN
BY DON E. E. VOGLER
GERALD A. MARSH
Cushman, Darby & Cushman
ATTORNEYS

Fig. 4a.

INVENTORS
ROBERT T. BROWN
BY DON E. E. VOGLER
GERALD A. MARSH
Cushman, Darby & Cushman
ATTORNEYS

MULTI-SEGMENT CLAMP

BACKGROUND OF THE INVENTION

For connecting conduit parts (including pipes, vessels, blind flanges, covers, reducing nipples, burst disk assemblies, various hubs, and the like) to one another in the petroleum industry (including on well heads, on platforms, in collection systems and in petrochemical plants) as well as in the chemical process industries, in ground support facilities for rocketry, in boiler equipment for industry generally and particularly in steam power plants including those supplied with thermal energy by nuclear reactors there has come into wide use a number of pipe fittings which generally include hubs for the conduit parts to be connected, a sealing ring for interposition between the adjacent ends of the conduit parts and an exterior, generally circumferentially extending clamp which can be fastened about the hubs to retain the joint in an integrated condition. Such conduit connections are illustrated in the 1968-69 *Composite Catalog of Oil Field Equipment and Services*, Gulf Publishing Company, Houston, Texas, at pages 2141-2143 and in the U.S. Pats. of Watts et al., Nos. 2,766,829; 2,766,998; and 2,766,999, issued Oct. 16, 1956 and further examples are shown in the U. S. Pats. of:

| Watts | 3,181,901 | issued May 4, 1965 |
| Watts et al. | 3,231,297 | issued Jan. 25, 1966 |
| Brown | 3,307,862 | issued Mar. 7, 1967 |
| Crain et al. | 3,403,931 | issued Oct. 1, 1968 |

In many instances the prior art clamps comprise units of arcuate segments assembled end to end by devices which permit diminishing and enlarging the girths of the units to permit establishing and breaking connections. Some clamps are remotely actuable so that, using them, joints may be made-up and broken from a distance: three examples of such are illustrated under the heading "GRAYLOC Quick Disconnect Units" on page 11 of *GRAYLOC Pipe Fittings Catalog 68*, Gray Tool Company, Houston Texas.

Particularly where expansible/contractile clamps must be of large diameter to accommodate connection of large diameter conduit parts, certain factors which do not dominate design considerations in smaller diameter joints, assume much greater importance. Among these are the amount of radial movement needed to grip the conduit parts at an inner extreme and be free of at least one of them at an outer extreme; the need to accommodate unavoidable warpage of parts subject to extremes of temperature over a long period; the need to supply uniform clamping force about the periphery of the joint; and the need to ensure that the clamp, when being expanded, moves outwardly from the conduit parts throughout its whole circumferential extent.

In the instances of the clamps specifically referred to above with reference to patents and catalog pages flexible, tapered-lip metallic sealing rings are preferably interposed between the conduit parts being joined. Accordingly, the clamp in contracting engages the conduit parts flanges while they are yet spaced axially from one another and applies force to draw them axially toward one another against resilient force provided by the flexible lips of the sealing ring as the latter are deflected into sealed relationship with the conduit parts. Especially where the axial distance between the point where the sealing ring is in initial contact with both conduit parts and the point where the clamp has contracted to pull the conduit parts into mutual engagement with each other and/or with stop means protrusions of the sealing ring is relatively large, difficulties are encountered in conventional clamp arrangements, in effect because the prior art clamps cannot "reach" axially to initially grasp one conduit part and pull it toward the other. Thus, such conventional clamps must be axially longer and radially thicker than would be necessary to merely hold the joint together, in order to be able to perform the axial drawing together of the conduit parts while remaining axially relatively stationary itself.

Another problem encountered from time to time when using conventional clamp arrangements of the type wherein the clamp is always fastened to one of the conduit parts even when the joint is broken open, is that the clamp in protruding axially beyond the end surface of the conduit part may restrict needed free access to the mouth of that conduit part.

SUMMARY OF THE INVENTION

The invention provides an expansible/contractile clamp for fastening about circumferential flanges or lugs on adjacent conduit parts to secure and retain the conduit parts mechanically integrated, preferably also in a pressure tight relationship. The preferred forms are susceptible of use in cryogenic, elevated temperature, cycling temperature and/or pressure operations involving conduit parts of large diameter, for instance 72 inches I.D., as well as conduit parts of smaller size.

The following further summarization refers to the presently preferred embodiments of the invention.

The clamping wedges are composed of similar tapered segments joined together by link bars and pins to form an unending chain whose circumference is varied by a threaded drive screw joining the end segments. Decreasing the chain circumference forces the wedges onto mating tapers on the conduit joint, drawing them together by mechanical advantage.

Cam slots are provided at various locations on the clamp support member to control the peripheral movement of clamp segments to provide uniform wedging force around the full circumference of the joint during makeup. The uniform clamp load is necessary for uniform seal loading and integrity.

Uniform clamp movement is partially controlled by ridges on the clamp segments which bear against the link elements during clamp operation, disallowing rotation of the clamp segments with respect to the link elements. Further control is attained by use of a peripheral can on which the clamp segments and links bear during opening. The individual segments conform to the can I.D. thus causing further clamp motion to be in a tangential direction transferring to subsequent segments. Thus, symmetry and a maximum open diameter is maintained with a minimum amount of clamp movement.

Safety locking of the clamp assembly is attained by restricting the drive screw operation. This restriction is achieved by placing a slotted plate over the drive screw trunnion bosses.

Initial alignment of the mating conduit joints is achieved during makeup by use of a guidance taper on the inner edge of the clamp segments. As the mating joints near one another, interlocking tapers on the joint faces come into action completing the guidance and maintaining relative concentricity after joining.

Proper control of the axial motion of the clamp is necessary for satisfactory operation. The clamp guidance plate in conjunction with guide pins passing through the plate is used to control this vertical motion. When an application requires that the clamp axis be horizontal or that the clamp be maintained on the lower portion of a vertical joint, support springs are used to hold the clamp in an axially extended position to take full advantage of the clamp's ability to draw the conduit joints together from a separated position. When an application requires that the clamps be maintained on the upper portion of a vertical joint, the springs may be omitted since the clamp weight will hold it in an extended position. The guide plate containing the cam slots serves thus as a restriction on the axial clamp movement and a support for the support springs.

The guide plate may be arranged such that the entire clamp assembly may be removed as a unit from the conduit joints. It may also be arranged with a locking sleeve that will allow the clamp assembly to slide along the conduit and lock in a position so as not to restrict access to the conduit opening.

BRIEF DESCRIPTION OF THE DRAWINGS

The principles of the invention will be further hereinafter discussed with reference to the drawings wherein preferred embodiments are shown. The specifics illustrated in the drawings are intended to exemplify, rather than limit, aspects of the invention as defined in the claims.

DESCRIPTION OF THE ILLUSTRATED EMBODIMENTS

With reference to FIGS. 1–4b, a joint 10 is shown between the bottom cover 12 of a delayed coking unit, by way of example, and a tubular hub 14 welded onto the lower end of the coking unit sidewall at 16. Interposed between the ends of the hubs 12 and 14 is a sealing gasket 18 which in this instance is made of Inconel-filled asbestos. As the design pressure for the particular coking unit is 100 p.s.i.g. (including the hydrostatic pressure head resulting from filling of the unit with material to be coked) at 900° F in accordance with Section VIII of the A.S.M.E. Boiler and Pressure Vessel Code and because the I.D. of the hub 14 is large, e.g. 72 inches, considerable axial force on the parts 12 and 14 is required to prestress the seal at 18 as the joint is madeup.

Figure 3:
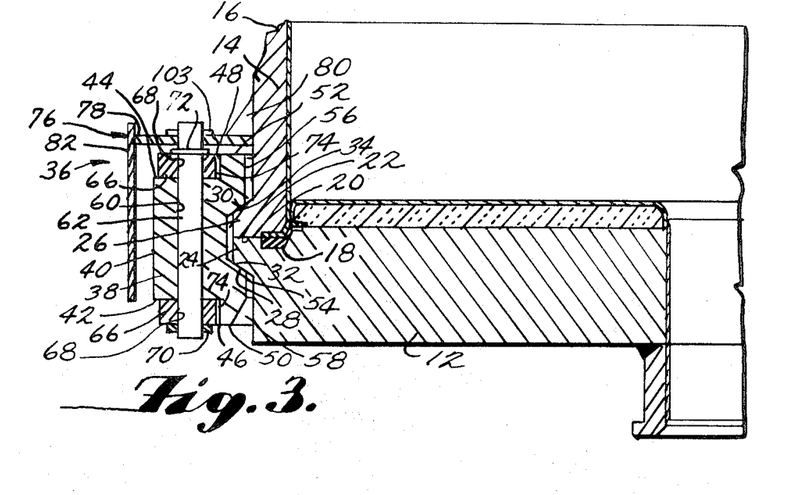
FIG. 3 is a longitudinal radial sectional view on line 3—3 of FIG. 1.
Figure 4A:
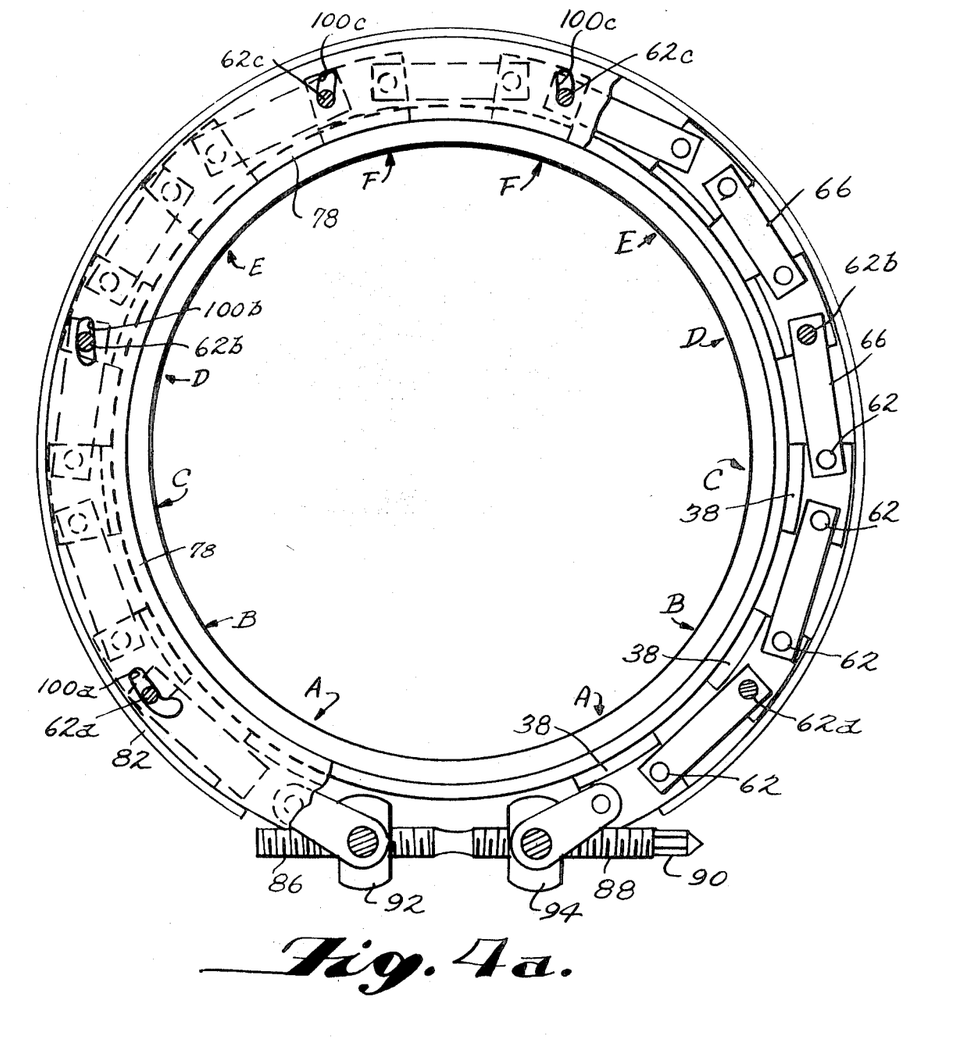
FIG. 4a is a top plan view of the clamp of FIG. 1, in a partly contracted, partly engaged condition; a partly expanded, partly disengaged clamp would exhibit a similar appearance.
Figure 4B:
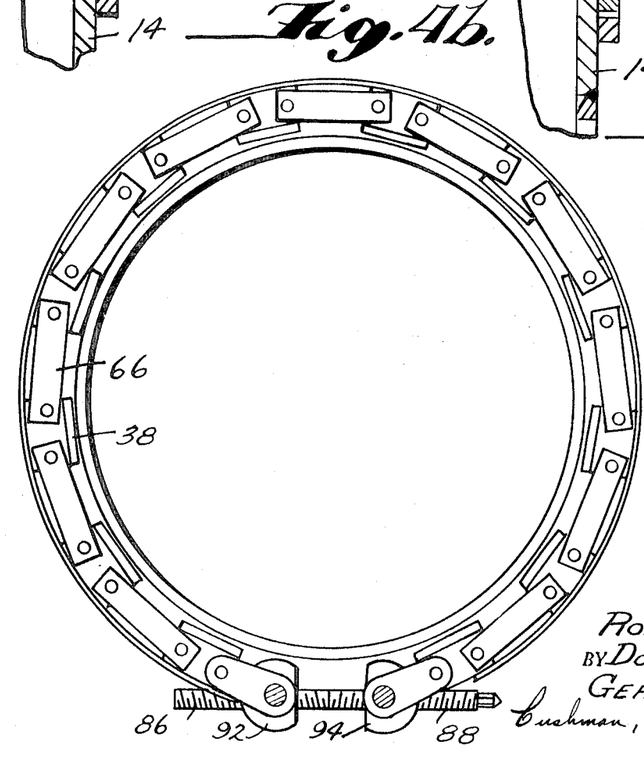
FIG. 4b is a transverse diametric sectional view on line 4b—4b of FIG. 2, of the clamp in a fully open, fully disengaged condition.

Adjacent the facing end surfaces 20, 22, the hubs 12 and 14 are exteriorly provided with radially outwardly projecting, circumferential flanges 24, 26 having back surfaces 28, 30 which taper in such sense as to decrease the radial thickness of the flanges as they proceed radially outwardly from the respective hubs 12, 14. Thus the surfaces 28, 30 constitute tapered wedging surfaces for the receipt of corresponding surfaces 32, 34 of a clamp unit 36.

The clamp unit 36 comprises a plurality (for instance 12) angularly short (for instance about 15° long) arcuate segments 38 each having a vertical, arcuate-exterior surface 40 which at its opposite extremes intersect with radially extending surfaces 42, 44 at their respective radially outer extents. Short of the radially inner extents of the segments 38, the surfaces 42, 44 intersect downwardly and upwardly vertically extending exteriorly arcuate shoulders 46, 48 at their respective bases. The shoulders 46 and 48 respectively extend to the lower end surface 50 and upper end surface 52 of each respective segment. The segments interior is generally cylindrically arcuate at 54, 56, but at 58 adjacent and leading to the lower end surface 50, the interior flares to provide a guide level for initially guiding the clamp segments over the flange 24 as the parts 12 and 14 are moved axially toward one another, or more particularly, as the part 12 is moved toward the stationary part 14. The segments interior axially between the surfaces 54 and 56 is arcuately notched angularly of the segments to provide radially inwardly opening grooves whose flanks define the corresponding wedging surfaces 32, 34 of the clamp unit. Adjacent the two ends which constitute the termini angularly, of each segment, two respective vertical openings 60 are formed through the segments, emerging through the surfaces 42, 44 and each receives a hinge pin 62 which protrudes from both emergences of each opening.

Except for the adjacent ends of the two segments which flank the clamp opening and closing device 64, the adjacent segments are hinged to one another at the top and bottom by clamp hinges in the form of elongated rigid links 66 having openings 68 vertically through them adjacent each end. The links are pivotally received on the protruding ends of the hinge pins 62 via the openings 68 and are shown retained by a threaded washer 70 at the lower end and a snap ring 72 fit in a corresponding groove in each hinge pin just above the upper link 66.

As shown, there is very little, if any, space between the inner vertical sides 74 of the hinge links and the shoulders 46, 48 when the clamp is in a contracted condition. Abutment between the sides 74 and the shoulders 46, 48 prevents further rotation of the links with respect to the segments and assists in the transmission of force from the clamp opening and closing device 64 to the segments diametrically opposite the device 64.

The clamp arrangement of FIGS. 1–4 further includes a clamp hanger support and guide plate assembly 76 which includes an annular, radially extending plate 78 which circumferentially surrounds the hub 14 and is secured, for instance by welding and strengthening gussets 80, to the exterior of the hub 14 at a level spaced axially from the wedging surface of the hub 14 end flange. At its outer edge, the plate 78 mounts a tubular "can " or wall 82 which extends axially to radial adjacency with the segments 38 surfaces 40. The can 82 terminates angularly short of completely surrounding the clamp in order to allow working room for the clamp opening and closing device 64.

The device 64 as shown includes a drive screw 84 having two axially spaced portions 86, 88 which are helically threaded in an opposite sense from one another and a cranking portion 90 of non-circular section for receipt of an air motor chuck, hydraulic motor chuck, hand crank, or the like for rotating the drive screw 84 about its own longitudinal axis. Received on the threaded portions 86, 88 in driven relationship thereto are trunnions 92, 94 which include vertically upwardly and vertically downwardly extending stub axle pins 96. Four elongated rigid links 98, via openings 100, 101 adjacent their opposite ends, connect the two near hinge pins of the respective segments nearest the trunnions to the two respective trunnions so that rotation of the drive screw in a first sense will generally radially contract the clamp by transmission of force through the links, pins and segments and so that rotation of the drive screw in a second, opposite, sense will generally radially expand the clamp.

The clamp is supported in position by virtue of the extension of certain of the segment hinge pins and the two trunnion stub axle pins 96 upwardly or downwardly through slots in the plate 78. In the embodiment shown, which includes twelve segments, the trailing hinge pin 62 of every second segment, beginning with the two segments on each flank of the device 64 and proceeding in opposite clockwise senses to the back of the clamp, is provided with an upward projection 62a, 62b, 62c extending through respective slots 100a, 100b, 100c in the plate 78. The two trunnion stub axle pins 96 are similarly received through respective slots 100d. Threaded washers 102 received on the upper ends of the projections 62a, 62b, 62c cause the clamp to be supported in a hanging fashion from the plate 78.

Figure 1:
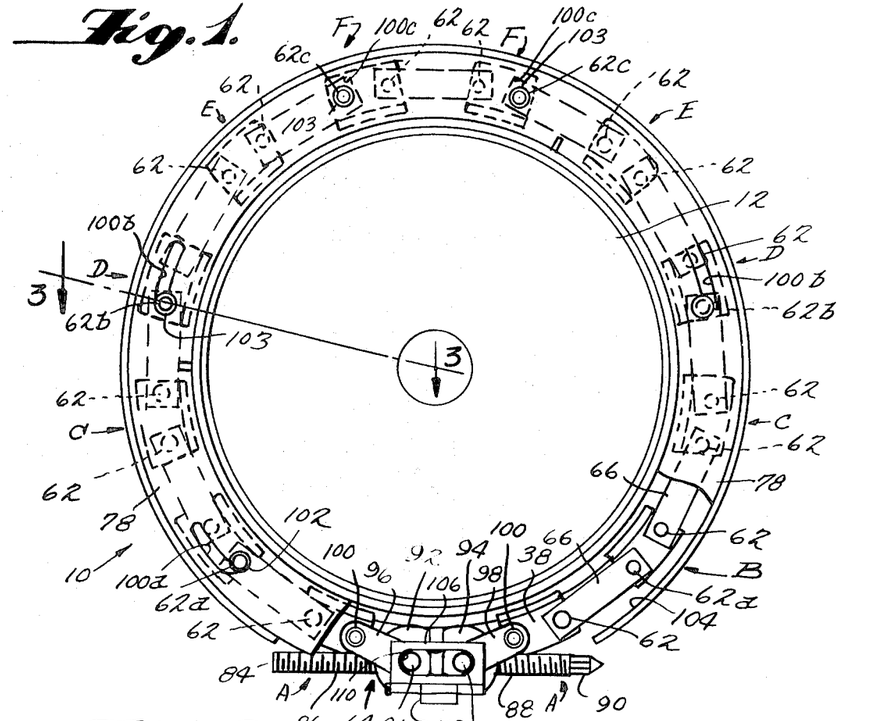
FIG. 1 is a top plan view of a conduit part connection incorporating a clamp arrangement in accordance with the invention.
Figure 1A:
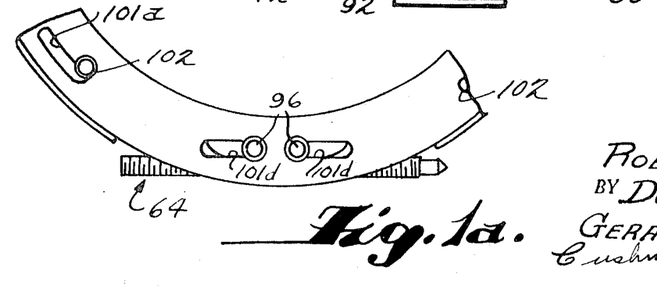
FIG. 1a is a fragmentary top plan view of the portion of the hub-surrounding slotted plate showing the slots which, in each of the embodiments, control movement of the trunnions during clamp opening to force the front clamp segments to move tangentially against the retaining can.

With reference to FIGS. 1 and 1a, it is now important to notice that the pairs of slots 100a, 100b, 100c and 100d are all elongated, but that each pair is configured or oriented differently from the others.

The slots 100a are curved relatively sharply radially inwardly near their ends closest to the device 64 and proceed generally angularly of the plate 78 over their remainders.

The slots 100b are generally arcuate throughout their lengths, convex radially outwardly and gradually proceeding radially outwardly of the plate 78.

The slots 100c near the back of the clamp proceed generally radially of the plate 78 throughout their length.

The slots 100d near the front of the clamp proceed generally perpendicularly to a radius of the clamp passing midway between them. These slots, which receive respective trunnion stub axle pins 96 to restrict the radially outward movement of the trunnions during clamp opening, thereby forcing the front clamp segments to move tangentially against the retaining can 28. The slots 100d also fix the position of the trunnions to ensure they will be positioned for proper locking by the plate 106 slot 110 as will be described further below.

In each instance, the slots 100a, 100b, 100c are so configured that with the pin projections 62a, 62b, 62c at the forward, radially inner ends of the slots, the clamp segments all bear the relationship to the hub wedging flanges shown for one segment in FIG. 3, and so that with the pin projections 62a, 62b and 62c at the rear, radially outer ends of the respective slots 100a, 100b, 100c, the clamp segments vertical arcuate exterior surfaces 40 are all in extensive engagement with the inner peripheral surface 104 of the can 82.

Furthermore the lengths and positions of the slots 100a, 100b and 100c are such that during rotation of the power screw to contract the clamp, the segments at positions A through D first move generally angularly of the hub 14 without closing in on it very much. During this stage the pull exerted by the trunnions through the links, pins and segments, pulls the rear segments at positions E and F into contact with the wedging surfaces of the end flanges of the hubs 12 and 14. Upon further rotation of the drive screw in a sense to contract the clamp the segments at D and C are gradually drawn radially inwardly into contact with the hubs wedging surfaces, and finally, further rotation of the drive screw in the same sense draws the segments B and A into contact with the hubs wedging surfaces. Further tightening uniformly loads the joint about its circumference.

During rotation of the drive screw in an opposite sense, to expand the clamp, the pin projections 62a riding in the slots 100a initially cause the segments at positions A to be forced radially outward from the hubs to a point where the segments at A have their surfaces 40 in engagement with the can surface 104. Upon further rotation of the drive screw the surfaces 40 of the A position segments slide along the can surface 104 toward the back of the clamp, transmitting force and movement through the links and hinge pins to the segments at positions B, C, D, E and F which, in that order, are forced free of the hubs wedging surfaces and into engagement with the can inner peripheral surface 104. In this process the segments at positions B, C, D and E travel angularly with the can surface 104 as a guide.

Thus the diversely configured slots 100a, 100b, 100c and 100d perform important functions in the expansion and contraction of the clamp and the can surface 104 performs an important guide function during expansion of the clamp.

If these functions were not provided, rotation of the drive screw in a sense to contract the clamp would initially pull the segments at positions A and B into such tight frictional engagement with the hubs end flange wedging surfaces that these segments would be unable to slide around towards the drive screw sufficiently to pull in the segments at positions F through C. Thus the joint would be more highly loaded at its front than at its rear and would likely perform unsatisfactorily. Likewise, upon attempting to expand the clamp, if not provided with these functions, it would be found that relaxation of tension by reversal of the sense of rotation of the drive screw would not of itself pull any of the segments free of the hubs end flange wedging surfaces, with the possible exception of the segments at position A, unless a much longer drive screw were provided.

It should now be further noticed that the clamp expanding and contracting device 64 of FIGS. 1–4b is provided with a safety mechanism in the form of a slotted plate 106 hinged at 108 to the plate 78. The plate 106 slot 110 is elongated in a sense parallel to the drive screw and is of such a length that, after the clamp has been fully contracted, the plate 106 may be rotated to its FIGS. 1 and 2 position, wherein the two trunnion upwardly extending axles are disposed in the slot 110 in contact with its opposite ends. Accordingly, even if the drive screw had a tendency to rotate because of stress or vibration, the keeper 106 would prevent relaxation of the clamp.

DESCRIPTION OF EXEMPLARY DETAILS OF THE FIGS. 1–4 EMBODIMENT

The drive unit consists of a left- and right-hand threaded trunnion and an 8 ACME 2G drive screw. A safety lock plate is provided which fits over the ends of the trunnion pins to provide a multiple holding element to satisfy the requirements of paragraph UG-35 of the ASME Boiler and Pressure Vessel Code, Section VIII. Clamp guide pins, along with the trunnions, are attached to a clamping support and guide plate, which is in turn attached directly to the hub 14. Cam slots are provided in the guide plate to control the makeup movement of the clamping unit and an outside retaining can is provided on the guide plate to control the opening movement. The clamp in the open position is centered around the hub O.D. at whatever specified clearance is desired. The unit, as designed, however, is set up for minimum opening to allow for blind hub removal and reassembly, whereby the clamping segments provide a guide for the blind hub until the internal centering taper is engaged. The clamping units as shown in FIGS. 1–4 are established for 50 per cent hub-clamp contact, which, depending upon the severity of the thermal distortion problem, may be increased to approximately 70 percent clamp-hub contact. The unit is designed for a separate driving unit to provide more flexibility in the overall system. The gasket design is a tongue and groove style which can utilize either a conventional flat asbestos gasket or an Inconel mesh-filled asbestos packing.

To close the clamp the blind hub is raised into position to within approximately one-fourth inch to one-half inch of the face of the mating hub. The drive screw is then rotated clockwise which will draw the two trunnions circumferentially together (since a left and right hand thread arrangement is provided on these units). As the clamp begins to circumferentially draw together, the camming guide slots control the movement of the clamp segments whereby the back of the clamping unit (that side which is farthest away from the drive screw) is brought into contact with the hubs first. The clamping segments along the sides of the unit are drawn initially forward towards the drive unit and then are allowed to engage the hub segments after the back segment has become partially engaged. The front quadrant clamping segments move parallel to the hub surfaces for a still greater distance, allowing the back and side segments to become partially engaged, and then they move radially inward toward the hub surfaces. This camming action is incrementally controlled whereby the back units become partially engaged, the side units become partially engaged, and then the front units become partially engaged, at which time the back units are beginning to become fully engaged. Additional tightening engages the back units, the side units and then the front units, at which time full loading is applied to the entire clamping surfaces. When makeup torque has been reached, the safety plate 106 is engaged with the trunnion pins and the unit is ready for operation.

To open the unit, the safety plate must be raised prior to operation of the drive screw. The drive screw is then turned counterclockwise at which time the trunnions begin to circumferentially separate. As the front quadrant clamp segments move outward and contact the retaining can, an external camming force (causing tangential circumferential loads to be applied to the remaining segments) sequentially forces the remaining clamp segments off the hub tapers. In the full open position, all of the clamp segments are wedged back against the inside of the retaining can and the clamp is centered around the hub O.D. The blind hub 12 may then be removed.

The multi-segment clamp is generally of all steel construction. For use under corrosive environmental conditions, standard protective techniques may be used. For instance the clamp hinge pins and trunnions may be nickel coated for corrosion resistance and then coated with a molybdenum disulfide coating. The drive screw may be coated with the molybdenum disulfide coating. The hubs 12 and 14 may be weld overlaid with stainless steel material. Typically, the overlay material may consist of ⅛-inch Type 310 stainless steel. Other overlay materials may be applied. If stainless steel overlay is not required for the process in which the joint is to be used, 3- to 5-mil coating of electroless nickel deposit may be applied to the hub sealing and clamping surfaces to provide some atmospheric corrosion protection if needed.

The basic design of which FIGS. 1–4 show an embodiment is believed to comply with the ASME Code requirements for Section VIII, Unfired Pressure Vessels, since the allowable stresses and materials used comply with the requirements of the Code. Also, in the made up condition, the double link pin design provides for failure of one of the holding elements, without overstress or failure of the adjoining holding elements or reduction of the overall efficiency of the design. This is readily seen from the standpoint of the hinge links. However, the following explanation of the function of the hinge pins will help clarify the safety feature of this item. If a hinge pin fails between a link and clamp segment while under load at either the top or the bottom of the clamp segment, the other end of the pin, which is still engaged in the mating link, will carry the full circumferential load without failure, distortion or separation from the clamping segment, due to the surface area in contact between the clamp segment and the pin and the bearing stresses imposed upon it. If additional safety is required for individual applications, a center groove and a set screw arrangement can be utilized to insure that the position of the hinge pin remains constant. Also, since the safety plate engages the trunnion pins during the loaded condition, if the drive screw should fail, the safety plate is capable of carrying the full bolt preloading. These features in this design, therefore, preclude the addition of the special safety features required by paragraph UG–35, since failure of any one holding element of the particular unit will not cause failure of the entire unit. It may, therefore, be considered a multiple bolted connector.

The basic gasket configuration for the embodiment shown in FIGS. 1–4 is a tongue and groove design. A conventional flat asbestos gasket may be used when the vessel is properly preheated prior to injection of the coking oil (where the device is to be used as a delayed coking unit as explained above). This particular gasket design should be replaced after each coking cycle. An alternate gasket design, which will give some additional reusability, is a partially resilient, Inconel mesh-filled asbestos packing. The actual number of reuses of this type design will depend a great deal upon the handling procedures of the user and the length of time required for each coking cycle. In general, the overall gasket design will be similar to that currently being used in tongue and groove flanges; and, therefore, no additional sealing problems should be anticipated since the clamping and hub units have been designed to compensate for the thermal warpage problems which have been experienced in the past in flanged joints. Therefore, sufficient gasket loading will be available for a comparable service life.

Figure 2:
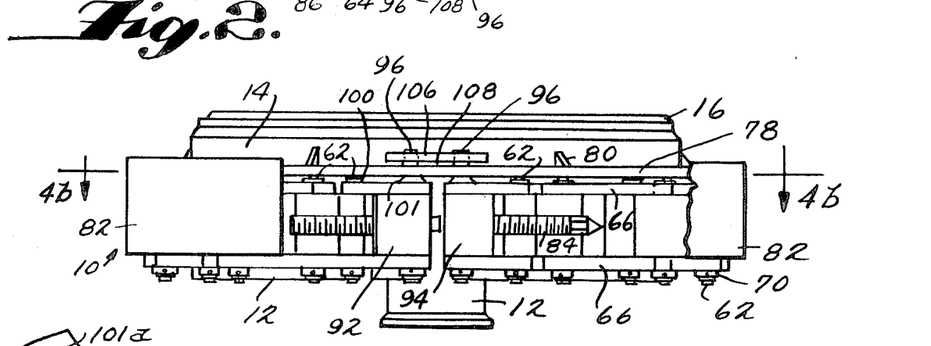
FIG. 2 is a side elevation view of the connection of FIG. 1.

In the embodiment of FIGS. 1–4 wherein the I.D. of the hub 14 is 72 inches as aforementioned, the O.D. of the circle of clamp segments, measured to a surface 40, is 94 inches when the clamp is fully contracted to make a joint and the diameter of the clamp retainer can internal peripheral surface 104 is 99 inches, which allows the segments to clear the hub 12 end flange O.D. by about 1 inch all around when the clamp is fully expanded. The torque needed to makeup the joint shown in FIGS. 1 and 2 is about 5,000 foot-pounds and the torque needed to break that joint is about 4,000 foot-pounds.

DESCRIPTION OF THE FIGS. 5–7 EMBODIMENTS

The embodiment depicted in FIGS. 5–7 differs from that shown in FIGS. 1–4 only in the following respects:

a. the clamp is mounted for limited axial movement during makeup;

b. the sealing means between the conduit parts is a flexible lipped metallic sealing ring of the type shown in the aforementioned 768–69 *Composite Catalog* at page 2141 and in the aforementioned *GRAYLOC Pipe Fittings Catalog* 68 at pages 3–8, 16 and 31;

c. cooperating joint makeup surfaces are provided on the ends of the hubs; and d. the hanging support and guide plate assembly can be moved back from the joint area when the clamp is in an expanded condition in order to permit freer access to the conduit ends.

Figure 5:
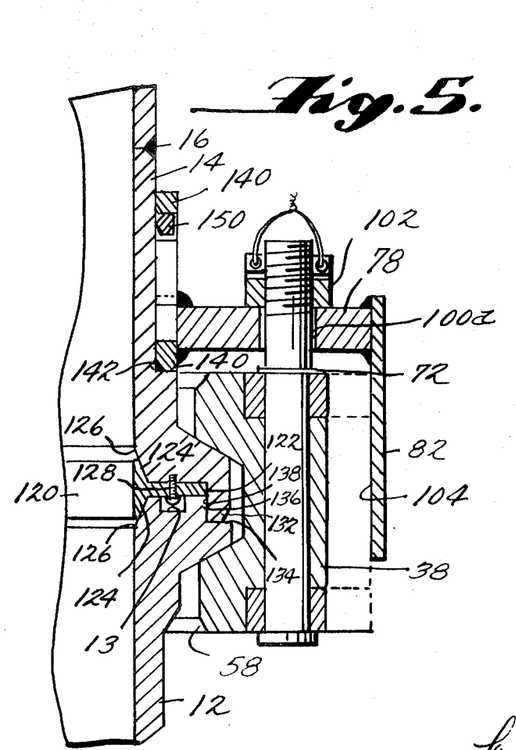
FIG. 5 is a longitudinal, radial sectional view, similar to FIG. 3, but of a first modification.
Figure 6:
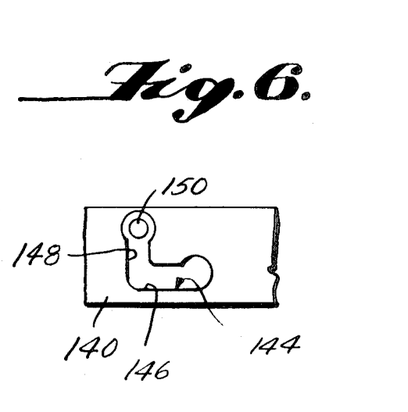
FIG. 6 is a fragmentary elevation view of the clamp support ring and one support lug of the FIG. 5 embodiment.
Figure 7:
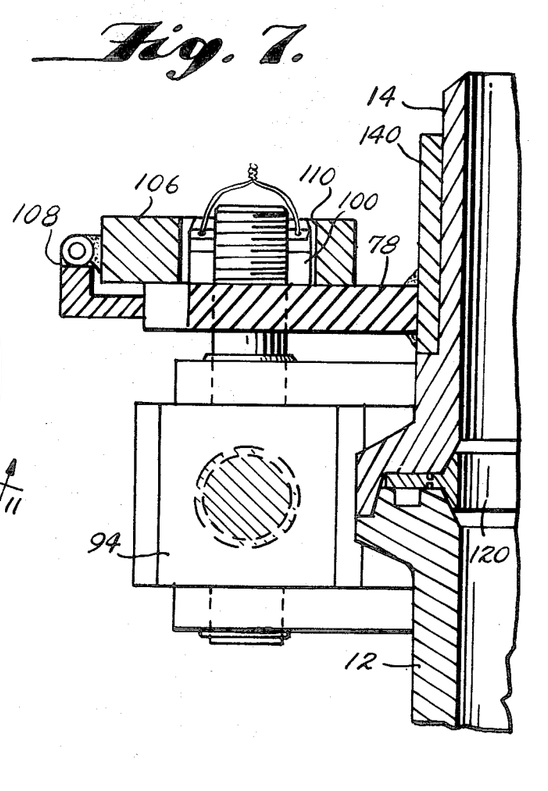
FIG. 7 is a longitudinal, radial sectional view of the FIG. 5 embodiment, taken on a plane passing midway between the two trunnions of the clamp.
Figure 8:
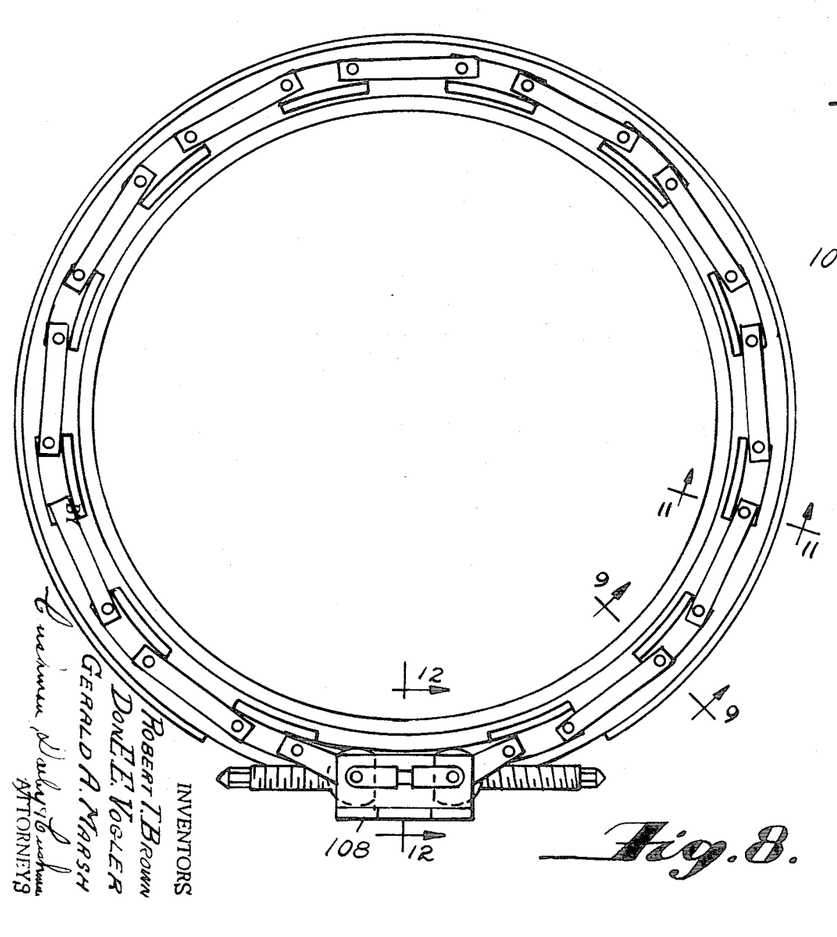
FIG. 8 is a top plan view of a further embodiment of the clamp arrangement in a conduit connection.

The remainder of the FIGS. 5–7 embodiment is substantially as described in respect to the FIGS. 1–4 embodiment and like numerals are used to designate comparable parts. By way of example, the I.D. of the hubs in FIGS. 5–7 is 47 inches and the entire apparatus shown in FIG. 5 weighs about 1,050 pounds.

a. The threaded fasteners 102 are shown comprising castellated nuts received on the upper ends of the projections 62a, 62b and 62c to support the clamp in a hanging fashion from the plate 78. The length of projections 62a, 62b and 62c between the bottoms of the nuts 102 and the tops of the snap rings 72 is greater than the thickness of the plate 78. Thus when the hub 14, with the clamp unit thereon in an expanded condition, is lowered toward the hub 12 for initiating establishment of a joint, the nuts 102 are resting on the plate 78 and thus relatively extending the expanded clamp toward the end flange of the hub 12. Then, as the clamp is contracted and the end flanges of the two hubs 12 and 14 are drawn together, the clamp may rise to remain centered about the hubs and flanges wedging surfaces. Upward travel would be limited only by abutment of the snap rings 72 with the underside of the plate 78, but in practice the amount provided for possible travel upward is greater than that needed to ensure that the clamp remains centered.

b. The sealing ring 120 is of generally T-shaped radial section and includes a radially outwardly directed rib 122 and two oppositely axially directed flexible lips. In the preferred construction, the ring 120 is an integral, steel part. In a relaxed state the ring 120 lips 124 taper on their exterior sealing faces at an angle more nearly parallel to the longitudinal axis of the ring than does the corresponding flared sealing surfaces 126 adjacent and leading to the ends of the hubs 12, 14.

For ease of assembly, the ring may be pre-assembled to one part, for instance to the hub 14 via screws 128 passing through suitable openings in the rib 122 and into the end of the hub 14. The screws 128 are turned into the hub 14 an insufficient depth to begin deflection of the ring 120 respective lip 124. Rather, the ring 120 will stand a short distance below the seated condition shown in FIG. 5. The end of the hub 12 is grooved or notched at 13 for receipt of the protruding head and shank portions of the screws 128 upon makeup of the joint. Accordingly, as the hub 14 and clamp assembly are lowered toward the hub 12 as aforementioned and the clamp contracted as aforementioned, the hub ends will be drawn axially toward one another causing the ring lip sealing surfaces to engage the corresponding hub sealing surfaces and the ring lips to thus become deflected until the stage where the hub ends abut the respective opposite axial faces of the ring rib 122, the lips are in resilient stressed, surface-to-surface sealing engagement, and the screw 128 heads are disposed in the recess 130. Abutment of the ring rib with the hub ends prevents over deflection of the ring lips.

c. In order to properly center the hub 14 with the hub 12 as the former is initially guided towards the latter, the clamp segments at their lower radially inner peripheral corners are provided with tapered guide bevels 58 as aforementioned. To take over centering functions as the hubs get even closer to one another, a tubular axially extending collar 132 is provided on the end of the hub 14 coaxially therewith, and a circumferential recess 134 is provided on the radially outer corner of the end of the hub 12 the radially outwardly facing, radially inner wall 136 of the recess 134 tapers from its base. The radially inwardly facing, radially inner surface 138 of the collar 132 is of at least a greater diameter as the wall 136 at the base of the latter, preferably slightly greater. Accordingly as the collar 132 slips into the recess 134 camming action between the circular surfaces 138, 136 will bring the two hubs into desired concentricity for proper makeup of the joint.

d. When the joint is disestablished, since the clamp unit remains carried by the hub 14 even after the hub 14 has been removed from the vicinity of the unit 12, access to the end of the hub 14 could be undesirably impaired for certain operations. For instance, in some cases it might be desirable to use a crane to lift away the apparatus (not shown) on which hub 14 is integrally mounted, and to lower the apparatus end down onto a floor. In other instances, freer access to the mouth of the hub 14 may be needed in order to permit repairs or installation or removal of material from the apparatus. To accommodate these needs, the plate 78 in the FIGS 5–7 embodiment is welded to an axially short tubular sleeve 140 which is exteriorly peripherally received on the hub 14. The hub 14 exterior is recessed in the vicinity of the sleeve 140 to provide an upwardly facing circumferential shoulder 142 upon which the sleeve 140 is supported when in its FIG. 5 position.

With reference to FIGS. 5 and 6, the sleeve 140 is provided with a plurality, for instance three equiangularly spaced, L-shaped slots 144 which proceed radially therethrough, each having a lower, horizontal leg 146 and an upper, vertical leg 148. A corresponding number, in this instance 3, support lugs 150 are secured to the exterior of the hub 14 in positions so that each projects radially outwardly into respective L-shaped slot 144. The support lugs 150 all bear the same positional relationships to the respective slots 144. Thus, normally, the lugs are at the tops of the vertical legs of the slots as shown in FIGS. 5 and 6, but when raising of the fully expanded, disengaged clamp unit is desired, the sleeve 140 is raised and turned clockwise to bring the lugs to the detents at the extreme outer ends of the horizontal legs of the slots 144.

DESCRIPTION OF THE FIGS. 8–12 EMBODIMENT

The embodiment depicted in FIGS. 8–12 differs from that shown in FIGS. 5–7 only in the following respects: The entire clamp unit is inverted and carried on the lower of the hubs; for ease of comparison with the FIGS. 5–7 embodiment, the hubs are also numbered as if inverted, similar parts receiving the same numbering. In order to urge the clamp toward full axial extension (i.e. in the instance depicted) a coil spring 154 is provided about each hinge pin projection 62a, 62b, 62c having one end bearing against the respective clamp link and the other against the plate 78.

Figure 9A:
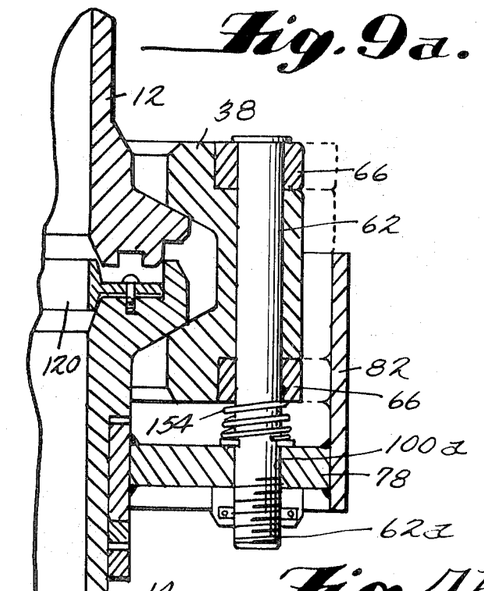
FIG. 9a is a longitudinal, radial sectional view on line 9—9 of FIG. 8, showing the clamp in a partly open/partly closed condition.
Figure 9B:
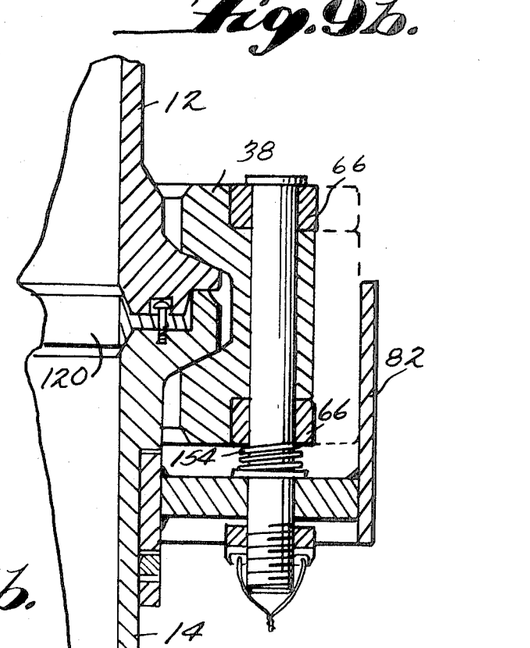
FIG. 9b is a longitudinal, radial sectional view on line 9—9 of FIG. 8, showing the clamp in a closed condition.
Figure 10:
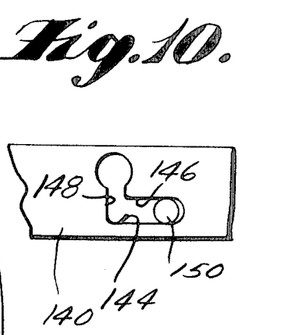
FIG. 10 is a fragmentary elevation view of the clamp support ring and one support lug of the FIG. 8 embodiment.

Accordingly, with reference to FIG. 9a, then FIGS. 9b, when the joint is initially being made up by contracting the clamp, the segments and links are initially in an axially extended condition, for engaging the end flange wedging surface of the hub 12 as the hub 12 is lowered toward the hub 14. Upon further tightening of the clamp, the clamp rides down compressing the coil springs 154 in order to remain centered at the joint as the sealing ring lips are resiliently deflected and the hub ends brought into abutment with the sealing ring radial rib.

In other respects the apparatus of FIGS. 8–12 operates as described above in respect to FIGS. 1–7.

Figure 11:
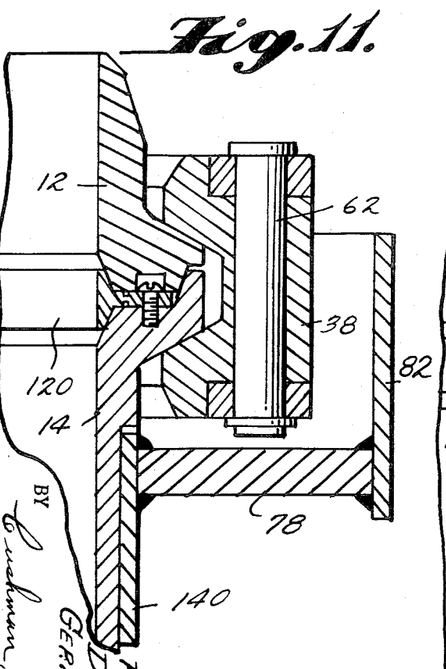
FIG. 11 is a longitudinal, radial sectional view on line 11—11 of FIG. 8.

FIG. 11 illustrates the appearance of those of the clamp hinge pins 62 which do not have the projections 62a, 62b, 62c.

Figures 12, 13:
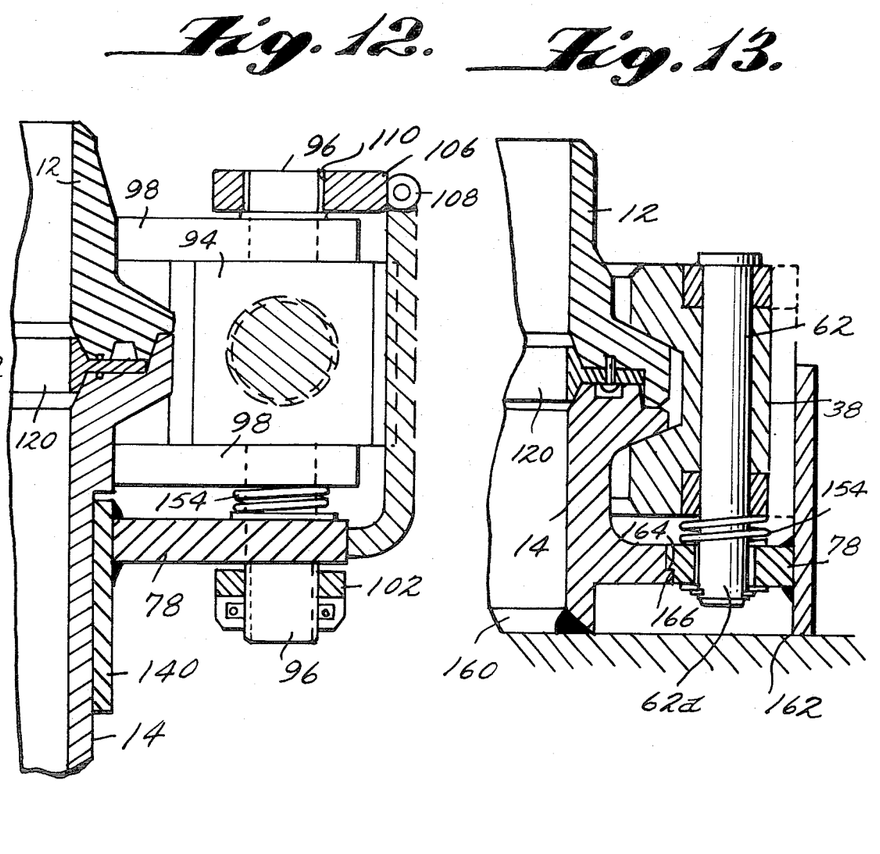
FIG. 12 is a longitudinal, radial sectional view on line 12—12 of FIG. 8.
FIG. 13 is a longitudinal, radial sectional view, similar to FIG. 9b of a further modified embodiment.

FIG. 12 illustrates the mounting of the trunnions which includes coil springs 154 about the trunnion axles between the trunnions and the support plate 78 for supporting the front quadrant of the clamp unit in the manner described in respect to the coil spring 154 which surround the hinge pin projections 62a, 62b, 62c.

DESCRIPTION OF THE FIG. 13 EMBODIMENT

The embodiment depicted in FIG. 13 differs from that shown in FIGS. 8–12 only in that the clamp support and guide plate assembly is simply supported on the hub 14 and the clamp retainer can is simply supported on a fixed base, so that when the clamp is fully expanded and the hub 12 removed from adjacent the hub 14, the entire clamp assembly including segments, links, hinge pins, clamp expanding and contracting device, support and guide plate assembly and clamp retainer can may be simply lifted free of the hub 14.

In the FIG. 13 embodiment, the hub 14 is welded onto a horizontal, fixed base at 160. The clamp retainer can also rests on this base at 162. Whereas the FIGS. 5–12 embodiments showed the support plate 78 connected to a slotted sleeve 140 carried on the hub 14 for movement between an extended and retracted condition, the support plate 78 of FIG. 13 at its radially inner periphery is provided with a downwardly facing circumferential shoulder 164 which normally seats on an upwardly facing circumferential shoulder 166 formed on the exterior of the hub 14. It should be plain from FIG. 13 that when the clamp is fully expanded, i.e. to the dashed line position shown, and the hub 12 is lifted free of the hub 14, the whole clamping assembly may be lifted free of the hub 14 also.

Although the clamp units have all been shown being operated by a turn buckle or drive screw and trunnions device, it should be apparent that other devices providing equivalent force and motion could be substituted.

At present, it is believed that three pair of cam slots for segments and one pair of cam slots for trunnion stub axle pins are an adequate provision for most situations. However, this is not to exclude the possibility of providing additional pairs of slots of progressive orientation as taught herein, should such be desired or believed needed in particular situations. Of course, the stub axle pins and hinge pin projections could perform their guiding functions if received in grooves which were not cut all the way through the slotted plate 106, should this be desired.

It should be apparent that the larger the diameter of the hubs to be clamped together, the greater must be the expansibility of the clamp as an absolute value.

Rather than providing drive screws of increasingly greater length ad infinitum as clamps of greater diameter are constructed, a plurality (for instance two or three) of such drive screws and corresponding trunnions and front segments may be provided about the circumference of the clamp for collectively expanding and contracting the clamp.

Familiar terms of spatial orientation such as "up" and "down" or similar ones used in this specification described preferred, usual orientation of the devices under discussion. They are used to convey the relevant concepts most expeditiously, and are not intended to exclude inversion, canting, recumbency or other varied spatial orientation of the devices described, unless the need for a particular orientation is evident.

It should now be apparent that the multi-segment clamp as described hereinabove possesses each of the attributes set forth under the heading "Summary of the Invention" hereinbefore. Because the multi-segment clamp of the invention can be modified to some extent without departing from the principles of the invention as they have been outlined and explained in this specification, the present invention should be understood as encompassing all such modifications as are within the spirit and scope of the following claims.

What is claimed is:

1. A circular, segmental clamp including a plurality of interconnected segments and incorporating between two such segments an expansion and contraction device actuable in a first sense to move said two segments of said clamp toward one another for contracting said clamp about conduit part end flanges for joining conduit parts and actuable in an opposite sense to move said two segments away from one another for expanding said clamp to free the conduit parts;

generally peripheral wall means surrounding said clamp and arranged to be engaged by and to radially confine said segments upon expansion of said clamp;

first cam means disposed axially adjacent said clamp at a plurality of angularly spaced locations; and second cam means on said clamp at a corresponding plurality of angularly spaced locations;

said first cam means and said second cam means being interengaged and cooperatively configured to:

upon initial contraction of said clamp from an expanded condition, move the clamp segments in a first group furtherest from said expansion and contraction device generally radially inwardly and the clamp segments in two second groups nearest said expansion and contraction device on angularly opposite sides thereof angularly toward said expansion and contraction device and the clamp segments in two third groups respectively angularly intermediate said first group and second groups radially inwardly at a lesser rate than the segments of said first group and angularly toward said expansion and contraction device at a lesser rate than the segments of said second groups;

upon further contraction of said clamp to a contracted condition to move the clamp segments in said third groups radially inwardly to the same radial extent as the segments of said first group;

upon initial expansion of said clamp from a contracted condition, force said clamp segments in said third groups radially outwardly into engagement with said generally peripheral wall means; and upon further expansion of said clamp to an expanded condition, move said clamp segments in said third groups angularly of said clamp in guided sliding contact with said generally peripheral wall means, move the clamp segments in said second groups radially outwardly into engagement with said generally peripheral wall means and angularly away from said expansion and contraction device, and move the clamp segments in said first group generally radially outwardly;

whereby in contracting, the clamp segments are progressively brought into contact with the conduit parts beginning with the segments furtherest from the expansion and contraction device and whereby in expanding, the clamp segments are progressively removed from contact with the conduit parts beginning with the segments nearest the expansion and contraction device;

the first cam means comprising an annular plate adapted to be supported axially adjacent said segments and links in a peripherally surrounding relationship to one of the two conduit parts;

first curved surface means in said plate near said clamp expanding and contracting device in both angular senses;

third curved surface means in said plate generally diametrically opposite said clamp expanding and contracting device; and second curved surface means in said plate angularly intermediate said first and third curved surface means in both angular senses; and the second cam means comprising:

follower means projecting from axially adjacent regions of said clamp and into engagement with respective of said curved surface means, each follower being slidable along a respective curved surface means and guided thereby;

each first curved surface means, proceeding from nearest said clamp expanding and contracting device, curving sharply radially outwardly while proceeding angularly to no greater degree so as to convex outwardly, then proceeding substantially angularly;

each second curved surface means, proceeding from nearest the respective first curved surface means, curving gradually radially outwardly and angularly so as to be convex outwardly; and each third curved surface means, proceeding from nearest the respective second curved surface means, proceeding substantially radially outwardly.

2. The joint of claim 1 wherein the curved surface means are constituted by respective slots formed axially through said plates and said follower means are slidingly received in respective of said slots.

3. A clamp assembly including:

an annular support and guide plate;

a generally tubular clamp retainer can secured on said guide plate, radially outwardly thereof and extending axially therefrom;

a plurality of clamp segments pivotally interconnected by means including axially directed hinge pins and forming a generally circular clamp;

a clamp expanding and contracting device interposed between two of said segments for forcing said two segments apart and drawing said two segments together to, via transmission of force and movement through said pivotally interconnecting means, respectively expand and contract said clamp;

first slot means in said plate near said clamp expanding and contracting device in both angular senses;

third slot means in said plate generally diametrically opposite said clamp expanding and contracting device; and second slot means in said plate angularly intermediate said first and third slot means in both angular senses;

axial projections on a plurality of said hinge pins constituting follower means each projecting into respective of said slot means each follower being slidable along a respective slot and guided thereby;

each first slot means, proceeding from nearest said clamp expanding and contracting device, curving sharply radially outwardly while proceeding angularly to no greater degree so as to convex outwardly, then proceeding substantially angularly;

each second slot means, proceeding from nearest the respective first slot means, curving gradually radially outwardly and angularly so as to be convex outwardly; and each third slot means, proceeding from nearest the respective secured slot means, proceeding substantially radially outwardly;

whereby in contracting, the clamp segments are progressively brought into contact with the conduit parts beginning with the segments furthest from the expansion and contracting device and whereby in expanding, the clamp segments are progressively removed from contact with the conduit parts beginning with the segments nearest the expansion and contraction device;

said clamp retainer can peripherally restraining radially outward movement of said segments during clamp expansion and guiding angular movement of the angularly moving segments during clamp expansion.

4. For securing together two conduit parts having radially outwardly directed end flanges, an expansible/contractile clamp comprising:

a plurality of clamp segments each having a radially inner face and a radially outer face;

means defining an angularly extending radially inwardly opening groove in each segment radially inner face, each groove being configured to receive and clamp together an angularly short portion of the end flanges of said two conduit parts;

a plurality of elongated links;

means pivotally connecting each link near each end thereof to adjacent twos of said segments, about axes parallel to one another and to the longitudinal axis of said end flanges, to provide a string of connected segments having two opposite ends;

a clamp expanding and contracting device connected between the two segments at said two opposite ends and constructed and arranged to pull said two segments toward one another to contract said clamp and to push said two segments away from one another to expand said clamp;

an annular plate adapted to be supported axially adjacent said segments and links in a peripherally surrounding relationship to one of the two conduit parts;

first slot means in said plate near said clamp expanding and contracting device in both angular senses;

third slot means in said plate generally diametrically opposite said clamp expanding and contracting device; and second slot means in said plate angularly intermediate said first and third slot means in both angular senses;

follower means projecting from axially adjacent regions of said clamp and into respective of said slot means, each follower being slidable along a respective slot and guided thereby;

each first slot means, proceeding from nearest said clamp expanding and contracting device, curving sharply radially outwardly while proceeding angularly to no greater degree so as to be convex outwardly, then proceeding substantially angularly;

each second slot means, proceeding from nearest the respective first slot means, curving gradually radially outwardly and angularly so as to be convex outwardly; and each third slot means, proceeding from nearest the respective second slot means, proceeding substantially radially outwardly;

whereby in contracting, the clamp segments are progressively brought into contact with the conduit parts beginning with the segments farthest from the expansion and contracting device and whereby in expanding, the clamp segments are progressively removed from contact with the conduit parts beginning with the segments nearest the expansion and contraction device.

5. A joint comprising:

a first conduit part and a second conduit part;

each said conduit part having means defining a radially outwardly projecting, generally circumferentially extending end flange, the end flanges being adapted to be drawn together for joining the conduit parts;

a circular clamp comprising a plurality of pivotally interconnected segments and an expanding and contracting device incorporated between two of said segments;

each segment including means defining an angularly extending, radially inwardly opening groove thereon for accepting axially adjacent portions of said end flanges for clamping said end flanges together;

said expanding and contracting device including means for actuation in one sense to draw said two segments toward one another for contracting said clamp and for actuation in another sense to force said two segments away from one another for expanding said clamp;

means supporting said clamp with respect to one of said conduit parts and including means for retarding radially inward movement of segments of said clamp adjacent said expanding and contracting device upon actuation of the latter in said one sense, until after segments of said clamp furthest from said expanding and contracting device have been substantially contracted;

resilient annular sealing ring means coaxially received between said conduit parts and configured to resiliently transmit sealing force to both said conduit parts as said clamp is being contracted, beginning prior to completion of contraction of said clamp whereby further contraction of said clamp must be conducted against said resilient force;

each conduit part end flange including means defining a circumferential, flared wedging surface facing axially away from the respective other conduit part end flange and enlarging in diameter axially toward said respective other conduit part end flange;

wherein each said segment groove includes two axially spaced, facing flanks tapering generally complementarily to said end flange wedging surfaces and being engageable therewith to draw said conduit parts axially toward one another against said resilient force;

wherein said supporting means includes means disposing said clamp axially further toward said other conduit part while said clamp is in an expanded condition and permitting axial movement of said clamp toward said one conduit part during contraction of said clamp, whereby said clamp when expanded is disposed to reach axially for the wedging surface of the conduit part on which the clamp is not mounted and to move with that wedging surface toward the conduit part upon which the clamp is mounted;

the supporting means including plate means disposed axially adjacent said clamp and having means defining a plurality of angularly spaced curved surface means thereon;

a plurality of angularly spaced pin means projecting axially from said clamp and into sliding engagement with respective of said curved surface means; and retaining means securing said pin means with respect to said plate means for limited axial and lateral movement of said pin means with respect to said curved surface means;

generally circular clamp container can means peripherally substantially surrounding said clamp and being engageable by segments of said clamp upon expansion thereof to maintain circularity of said clamp to limit expansion thereof and to transmit clamp opening angularly of said clamp from said two segments; and wherein said retarding means comprises portions of said curved surface means being shaped as cam means with respect to which said projecting pin means constitute cam followers, said curved surface means being of at least three differing dispositions and shapes including:

first curved surface means on said plate near said clamp expanding and contracting device in both angular senses;

third curved surface means on said plate generally diametrically opposite said clamp expanding and contracting device; and second curved surface means on said plate angularly intermediate said first and third curved surface means in both angular senses;

each follower being slidable along a respective curved surface and guided thereby;

each first curved surface means, proceeding from nearest said clamp expanding and contracting device, curving sharply radially outwardly while proceeding angularly to no greater degree so as to convex outwardly, then proceeding substantially angularly;

each second curved surface means, proceeding from nearest the respective first curved surface means, curving gradually radially outwardly and angularly so as to be convex outwardly; and each third curved surface means, proceeding from nearest the respective secured curved surface means, proceeding substantially radially outwardly;

whereby, in contracting, the clamp segments are progressively brought into contact with the conduit parts beginning with the segments furthest from the expansion and contracting device and whereby in expanding, the clamp segments are progressively removed from contact with the conduit parts beginning with the segments nearest the expansion and contraction device.

6. The joint of claim 5 wherein said supporting means includes a generally tubular sleeve;
means connecting said clamp to said sleeve; and
cooperating projection means on said one conduit part interfitting with and supporting said sleeve.

7. The joint of claim 6 wherein said tubular sleeve comprises a radially inwardly directed annular flange; and
wherein the cooperating projection means on said one conduit part comprises a radially outwardly directed annular flange having an outer diameter greater than the inner diameter of said radially inwardly directed flange;
said radially inwardly directed flange resting upon said radially outwardly directed flange, whereby upon expansion of said clamp, said clamp remains supported by said radially outwardly directed flange and is free to be lifted clear of said first conduit part.

8. The joint of claim 5 wherein the clamp expanding and contracting device comprises two trunnions;
means connecting said trunnions to respective of said two segments;
means defining two openings of opposite internal helical threading respectively laterally through the two trunnions;
a drive screw having two axially spaced portions exteriorly threaded in opposite senses;
said drive screw portions being threadably received in respective of said trunnion openings;
means on said drive screw for transmitting rotational force thereto for rotating said drive screw about its own longitudinal axis in both angular senses;
the means for connecting said trunnions to respective of said two segments including an axially directed axle on each trunnion and link means pivotally connecting respective axles to respective of said two segments; and
a safety device for preventing unintended expansion of said clamp, comprising safety plate means having slot means provided axially therethrough said safety plate means slot means having two opposite lateral ends spaced from one another by an amount sufficient to allow said trunnion axles to enter said slots when said clamp is fully contracted and to be engaged by both said opposite lateral ends, whereby said axles, and thus said trunnions, are prevented from moving apart.

9. The joint of claim 8 wherein the curved surface means are constituted by respective slots formed axially through said plate and said pin means are slidingly received in respective of said slots.

10. The joint means of claim 9 further including:
enlarged means on said pin means retaining said pin means in said slots for axial and lateral movement in said slots; and
wherein said disposing means comprises a coil spring surrounding each respective projecting pin means and bearing at opposite ends against said plate means and said clamp.

11. A method for contracting a clamp of the type having a plurality of interconnected segments to place the clamp in clamped together relationship two axially adjacent conduit part end flanges comprising:
interposing a resilient annular sealing ring between said conduit part end flanges;
pulling two adjacent ones of said segments angularly toward one another while forcing said two segments to remain out of clamped relationship with said conduit part end flanges, and by this pulling and forcing, bringing segments of said clamp diametrically opposite and progressively toward said two segments into initial contact with said conduit part end flanges; and
thereafter discontinuing said forcing while continuing said pulling and further pulling said two adjacent ones of said segments radially inwardly into initial contact with said conduit end flanges; and
tightening said clamp;
said tightening step being carried out against restorative force offered by said resilient annular ring, compressively stressing said resilient annular ring to a predetermined extent, while moving said clamp axially to maintain a constant axial positional relationship between said clamp and said sealing ring in which positional relationship said clamp is generally centered about said sealing ring.

* * * * *